United States Patent [19]

Lifshits et al.

[11] 4,296,305

[45] Oct. 20, 1981

[54] MACHINE FOR CONTINUOUS FLASH BUTT WELDING

[76] Inventors: Viktor S. Lifshits, Kavkazsky bulvar, 21, korpus 2, kv. 41, Moscow; Vadim P. Krivonos, Krasnoarmeiskaya ulitsa, 45, kv. 92, Kiev; Nikolai V. Podola, ulitsa Pushkinskaya, 8, kv. 12, Kiev; Boris L. Grabchev, ulitsa Tupoleva, 5, kv. 4, Kiev; Vladimir R. Andrianov, proezd Zarevoi, 3, kv. 19, Moscow; Rifkhat M. Shakirov, ulitsa Khudaiberdina, 1, kv. 16, Ufa, all of U.S.S.R.

[21] Appl. No.: 28,876

[22] Filed: Apr. 10, 1979

[51] Int. Cl.$^3$ .................................................. B23K 11/04
[52] U.S. Cl. .................................................. 219/101
[58] Field of Search .................................................. 219/97, 101

[56] References Cited

U.S. PATENT DOCUMENTS

| | | | |
|---|---|---|---|
| 3,612,811 | 10/1971 | Lifshits et al. | 219/97 |
| 3,681,563 | 8/1972 | Lifshits et al. | 219/97 |
| 3,748,431 | 7/1973 | Melbard et al. | 219/97 |
| 3,790,739 | 2/1974 | Lifshits et al. | 219/97 |

*Primary Examiner*—C. C. Shaw
*Attorney, Agent, or Firm*—Fleit & Jacobson

[57] ABSTRACT

A machine for continuous flash butt welding comprises control devices for the control of beginning-of-upset operation and upset value, respectively, and such control devices are provided in one unit (a computer). Also provided are a control device for automatically controlling the flashing-off speed and a welding current meter connected to a welding transformer. A sensor connected to the meter detects short-circuit duration in the welding circuit in response to outputs of a welding control enabling signal generator actuated at the final stage of flashing and in the course of upsetting. The inputs of the latter are coupled to the computer and the output is connected to an upset value deviation control circuit. The latter receives inputs from a circuit which detects slippage of the parts in the clamping jaws during welding. The upset value deviation control circuit is further connected to a sensor means for detecting misalignment of a rod of the follow-up slide valve relative to its body.

5 Claims, 5 Drawing Figures

MACHINE FOR CONTINUOUS FLASH BUTT WELDING

BACKGROUND OF THE INVENTION

1. Field of Application

The present invention relates to welding practice, and more particularly to a machine for continuous flash butt-welding of parts.

2. Description of the Prior Art

There is known a flash butt welding machine which comprises a frame with a movable clamping jaw and a stationary clamping jaw mounted thereupon, a hydraulic actuator intended for displacing the movable clamping jaw and governed by a follow-up slide valve, and devices for automatic control over the speed of flashing-off, beginning of the upset operation and upset value, said devices being provided with actuators and formed as a single unit. Irrespective of the fact that the welding process control parameters have direct bearing on the formation of a weld joint and flashing-off stability, it has been found that flash butt-welding machines sometimes fail to provide weld joints of desirable quality (cf. U.S. Pat. No. 3,790,739).

This instability in quality of weld joints may be due to:

accidental short-circuiting in the flashing-off butt ends at the moment prior to upsetting;

the deviation of the upset value from a calculated value or of the upsetting current time from a preset one.

Short circuits in the butt ends under flashing are observed prior to upset operation in the event of a considerable voltage drop in the supply circuit, as well as in the event of high power level set in the workpieces being welded due to an increase in the speed of flashing-off. Momentary periodical short circuits are impossible to be prevented because of the sluggishness of the welding machine movable plate.

A discrepancy between observed and preset, precalculated upset value results from the pressure change in the machine hydraulic system, or else due to the slippage of workpieces in the machine clamping jaws.

The deviation of the upset current time from an optimal value is observed in the event of failure in the operation of actuating means intended to cut out a welding transformer.

SUMMARY OF THE INVENTION

It is an object of the invention to provide a flash butt-welding machine which ensures stable quality of weld joints.

Another object of the invention is to improve reliability of welded joints.

These and other objects of the invention are attained in a flash butt-welding machine comprising a frame mounting a movable clamping jaw and a stationary clamping jaw, a hydraulic actuator for displacing the movable clamping jaw and governed by a follow-up slide valve, and devices for automatic control of the flashing-off speed, beginning of the upset operation and upset value, said devices being provided with actuators and formed as a single unit, wherein, according to the invention, the devices for controlling the beginning of the upset operation and upset value are combined in one unit comprising a computer and provided with a welding current meter whose input is connected to the primary winding of a welding transformer, a sensor adapted to detect short-circuit duration in the welding circuit and connected to the output of the welding current meter, a device intended to control deviations in the upset value and comprising sensors adapted to detect slippage of the workpieces in the machine clamping jaws during welding and mounted on said clamping jaws, a sensor for indicating misalignment of the follow-up slide valve rod relative to its body mounted on the follow-up slide valve body, and a welding control enabling signal generator, the inputs of the upset value deviation control device being connected to the outputs of the workpiece slippage sensors and to the output of the misalignment detecting sensors, the input of the welding control enabling signal generator being connected to output of the computer and its outputs being connected to the sensor for detecting short-circuit duration in the welding circuit switched at the final stage of flash operation and in the course of upsetting, and to the upset value deviation sensor.

The sensor adapted to detect short-circuit duration in the welding circuit preferably comprises three measuring channels for controlling short-circuit duration at the final stage of flashing-off prior to upset operation and upset current time according to its minimum and maximum permissible value, each of said channels being provided with the series-connected time interval setter, comparator with a memory element and indicator unit, the input of the second and third channels being connected directly to the welding control enabling signal generator, the input of the first channel being connected to said signal generator, to a welding current control sensor means and to a welding current ripple frequency sensor through a logical unit for indicating short circuits, the output of the welding current control sensor means being connected to the inputs of comparators of the second and third measuring channels.

The welding control enabling signal generator preferably comprises a means intended to convert the temperature of the workpiece flashing-off butt ends into voltage and an AND-NOT gate with two inputs, of which one is connected through an invertor and a comparator to a means for setting a temperature at the workpiece butt ends, corresponding to the onset of control over the continuously run flashing-off operation, and to the input of said temperature converter, the second input thereof being connected to make contacts of a relay coupled to a computer and to a second invertor, one of the input terminals of the temperature converter being coupled to a slide of the temperature setter potentiometer, the second input terminal of the temperature convertor being connected to a signal winding of a differential-transforming converter of a sensor intended to indicate the distance between thermocouples and the flashing-off butt ends having a common point with the input of a phase-sensitive amplifier of the computer, the output of the AND-NOT gate being connected to the first measuring channel of the short-circuit duration sensor means, and the output of the second invertor being connected to the inputs of the second and third measuring channels of said short-circuit duration sensor means, and through a delay element to the upset value deviation control means.

A means for converting the temperature of the flashing-off butt ends preferably comprises a balance-type potentiometer with a log-transformation characteristic, connected to a voltage source and having its input terminals connected to one of the input terminals of the temperature converter and to the input of a zero-crossing detector whose output is connected to a reversing electric motor having its shaft geared to a slide of the balance-type potentiometer and to a slide of the linear potentiometer connected to a d-c voltage source, the second input terminal of the zero-crossing detector being connected to the second input terminal of the temperature converter whose input terminals are connected to the slide and extreme point of the rheochord of the linear potentiometer.

A computer preferably comprises two self-compensating converters provided with reversing electric motors and intended to convert the measured temperature into rotation angles of said electric motor shafts, operational logarithmic, multiplication and algebraic addition elements, the logarithmic and multiplication elements being made integral in the form of slide-wire potentiometers with log characteristic and having extreme points thereof connected to the outputs of the sensor for detecting the distance between thermocouples and flashing-off butt ends and of the means intended for setting a temperature at the butt ends of the parts being welded and at the weld joint boundary, as well as to the output of a sensor means intended to register a current upset value and made in the form of a differential-transforming converter incorporating a core mounted on the frame and movable relative to a coil having two signal windings and a field winding and rigidly fixed on the movable clamping saw, the sides of said slide-wire potentiometers being geared to output shafts of converters whose inputs are respectively connected to the outputs of the thermocouples, the algebraic addition operational elements being provided by electrical series connection of the output circuits of said operational elements and temperature setter.

BRIEF DESCRIPTION OF THE DRAWINGS

The invention will be further described, by way of example only, in terms of preferred embodiments thereof with reference to the accompanying drawings, wherein.

DETAILED DESCRIPTION OF THE PREFERRED EMBODIMENT

Figure 1:
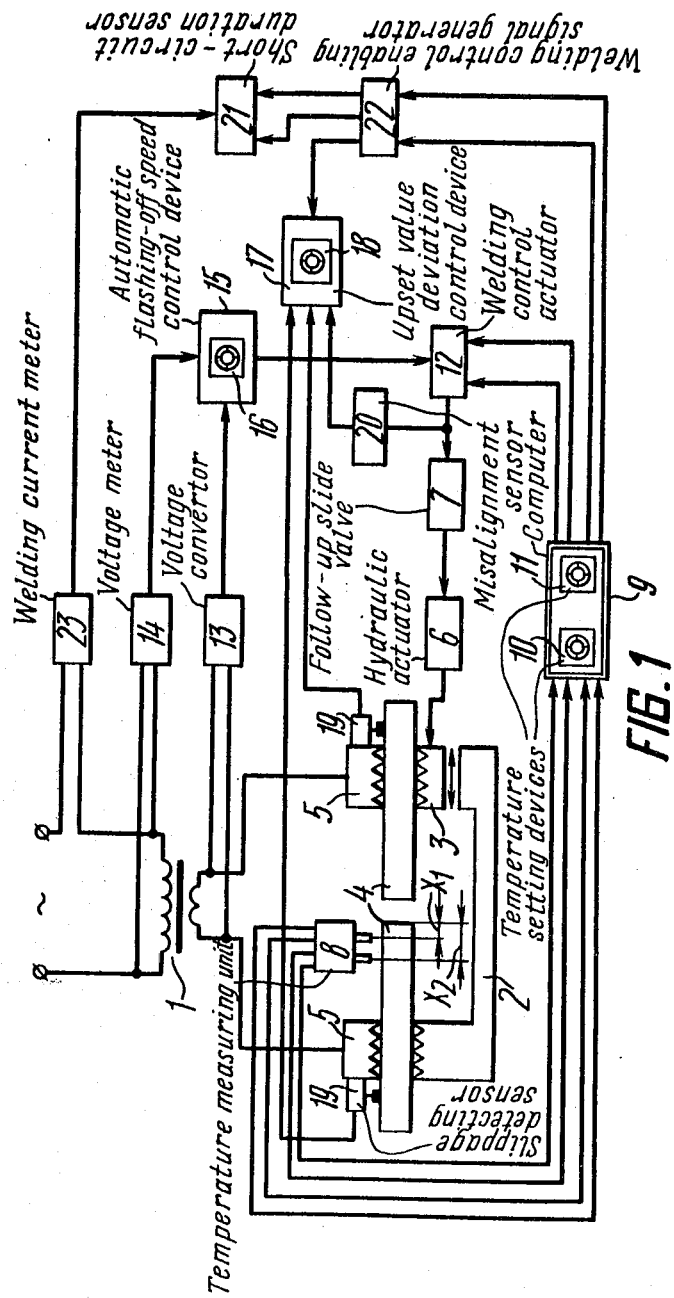
FIG. 1 is a block diagram of a continuous flash butt-welding machine according to the invention.

Referring now to the drawings in detail, the flash butt-welding maching of the invention comprises a welding transformer 1 (FIG. 1), a stationary clamping jaw 2 and a movable clamping jaw 3 for gripping articles 4 to be welded, the latter being provided with current leads 5, a hydraulic actuator 6 for displacing the movable clamping jaw 3, and a means for governing the actuator 6, made in the form of a follow-up slide valve 7, and also a unit 8 for measuring temperature $T_1$ and $T_2$ at the two sections of the articles 4 being welded and spaced apart at different distances $X_1$ and $X_2$ from the flashing-off butt ends. In addition, the welding machine of the invention incorporates a computer 9 with a device 10 for setting temperature $T_k$ at the article flashing-off butt ends prior to upsetting and a device 11 for setting temperature $T_b$ at the weld joint boundary, used to ensure control of the beginning of the upset operation and upset value, a welding control actuator 12 which is formed as a single unit combining devices for automatic control of the flashing-off speed, the beginning of upset operation and upset value of the articles being welded. The welding machine according to the invention also comprises a device 13 for converting voltage in the welding circuit, a meter 14 for measuring voltage at the primary winding of the welding transformer 1, an automatic flashing-off speed control device 15 with a device 16 for setting the power level in the articles 4 being welded, and an upset value deviation control device 17 with a device 18 for setting its linear value and a sensor 19 for detecting slippage of the workpiece 4 in the machine clamping jaws 2 and 3. The machine of the invention also comprises a sensor device 20 for indicating the misalignment of the rod of the follow-up slide valve 7 relative to its body, a sensing device 21 intended to register short-circuit duration in the welding circuits at the final stage of flashing-off and in the process of upset action, a welding control enabling signal generator 22 and a welding current meter 23 formed, for example, as a current transformer connected to the primary winding of the welding transformer 1. The outputs of the temperature measuring unit 8 are connected to the computer 9, the outputs of the voltage converter 13 and voltage meter 14 are connected to the inputs of the automatic flashing-off speed control device 15, whereas the outputs of the computer 9 and device 15 are connected to the actuator 12 acting upon the follow-up slide valve 7 operated to control the actuator 6 for displacing the movable clamping jaw 3. Connected to the output of the welding current meter 23 is the short-circuit duration sensing device 21, the input of the signal generator 22 is connected to the output of the computer 9 and its output is connected to the sensing device 21 and upset allowance deviation control device 17, the inputs of the latter being connected to the sensing slippage device 19 and the sensing device 20 for indicating the misalignment of the rod of the follow-up slide valve 7.

Figure 2:
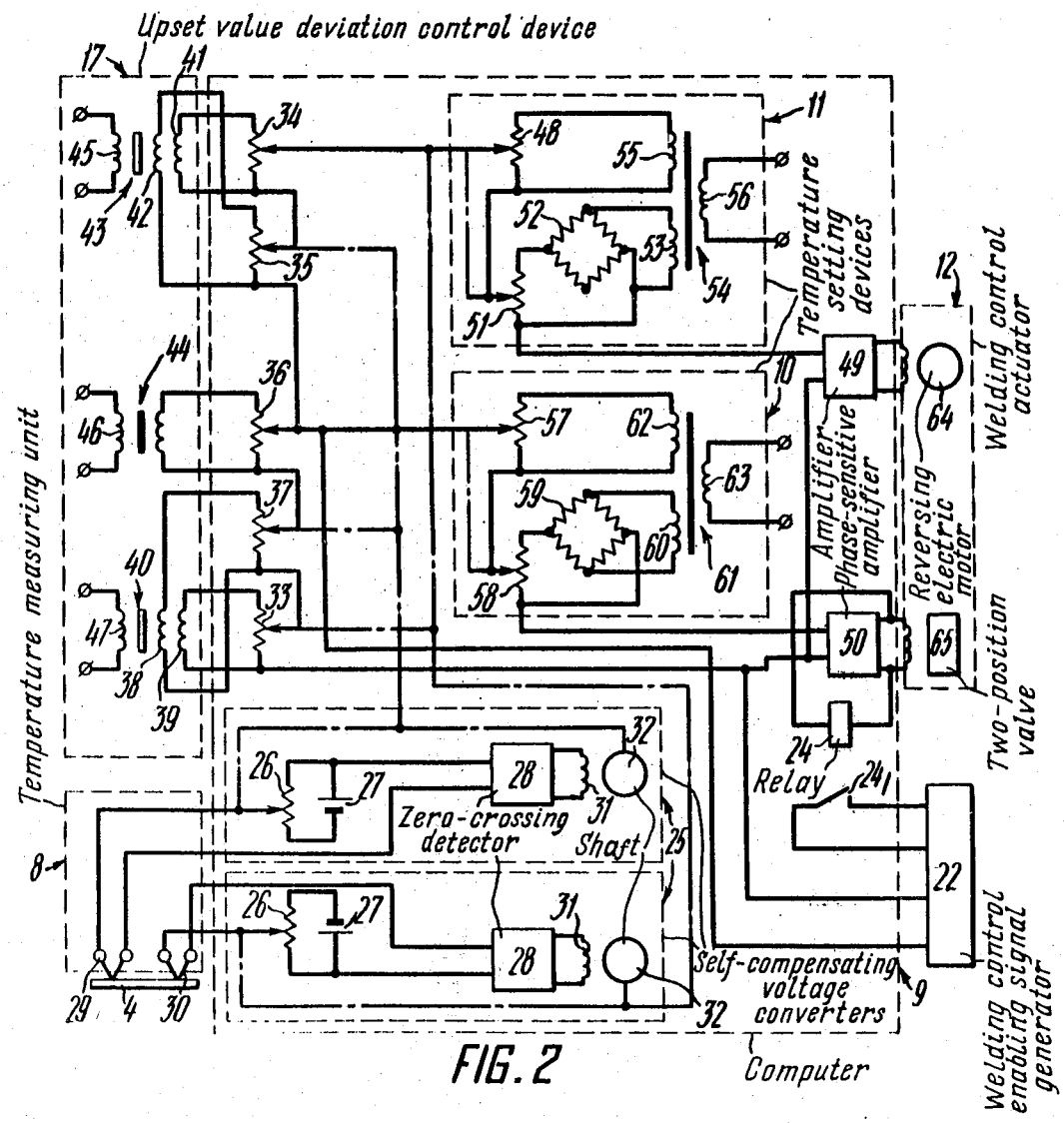
FIG. 2 is a functional diagram of a computer device according to the invention.

The computer 9 according to the invention comprises a relay 24 (FIG. 2) with a make contact $24_1$, as well as two self-compensating voltage converters 25 intended to convert signals, proportional to temperatures $T_1$ and $T_2$, into angles of rotation. Each of the converters 25 comprises a balance-type potentiometer 26 connected to a voltage source 27. One of the output terminals of the potentiometer 26 is connected to the input terminal of a zero-crossing detector 28. The other output terminal of the potentiometer 26 of one of the voltage converters 25 is connected to one of the terminals of a thermocouple 29, while the other output terminal of the potentiometer 26 of the other voltage converter 25 is connected to one of the terminals of a thermocouple 30. The other terminal of each of the thermocouples 29, 30 is connected to the input of the respective zero-crossing detector 28. The output of the zero-crossing detector 28 is connected to a field winding 31 of a reversing electric motor whose shaft 32 is geared to the slide of the balance-type potentiometer 26.

The shaft 32 of the electric motor of the first converter 25 is also geared to the slides of two slide-wire potentiometers 33, 34, and the shaft 32 of the second converter 25 is geared to the slides of three slide-wire potentiometers 35, 36 and 37.

The slide-wire potentiometers 33 to 37 have log transformation characteristic. The extreme points of the slide-wire potentiometers 33 and 37 are connected to signal windings 38 and 39 of the differential-transforming converter of the sensing device 40 intended to register a current distance between the unit 8 and the flashing-off butt ends of the workpiece 4 being welded (FIG. 1). The extreme points of the slide-wire potentiometers 34,35 are respectively connected to signal windings 41,42 of the differential-transforming converter of a sensing device 43 intended to register a current upset value. The extreme points of the rheochord of the potentiometer 36 are connected to the winding of a transformer 44 whose voltage corresponds to the distance between the thermocouples 29 and 30 intended to alternate temperature $T_1$ and $T_2$. Field windings 45,46,47 of a transformer 44 and of the sensing devices 40 and 43, respectively, are connected to power sources.

The potentiometers 33 to 37 are connected in series with one of the terminals of this connection being coupled to the slide of a potentiometer 48 of the device 11 for setting a temperature at $T_b$ at the weld joint boundary, the other terminal thereof being connected to the inputs of an amplifier 49 and of a phase-sensitive amplifier 50. The second terminal of the potentiometer 48 is connected to the slide of a potentiometer 51 connected to a temperature bridge circuit 52 connected to a winding 53 of a transformer 54. Current is supplied to the potentiometer 48 from the second winding 55 of the transformer 54, the extreme points of said potentiometer being connected to said winding. The terminal of the potentiometer 51 is connected to the input of the amplifier 49. The slides of the potentiometers 48 and 51 are kinematically interlinked. The field winding 56 of the transformer 54 is connected to a power source. One of the terminals of the circuit formed by series-connected potentiometers 33,36, 37 is connected to the slide of the potentiometer 57 of the device 10 for setting temperature $T_k$ at the flashing-off butt ends prior to upsetting. The other terminal of the potentiometer 57 is connected to the slide of the potentiometer 58 connected to the temperature bridge circuit 59 electrically connected to a winding 60 of a second transformer 61. The other terminal of the potentiometer 58 is connected to the input of the phase-sensitive amplifier 50. Current is applied to the potentiometer 57 from a second winding 62 of the transformer 61, to which it is electrically connected through its extreme points. The slides of the potentiometers 57 and 58 are kinematically interlinked. A field winding 63 of the potentiometer 61 is electrically connected to a power source.

The amplifier 49 has its output electrically connected to a reversing electric motor 64 geared to the actuator 12. Connected to the output of the amplifier 50 is the control circuit of a two-position valve 65 operated to initiate the beginning of the upset action and incorporated in the actuator 12, as well as the relay 24 monitoring the welding control enable signal generator 22 having its inputs connected to the output terminals of the circuit formed by the series-connected potentiometers 33,36,37.

Figure 3:
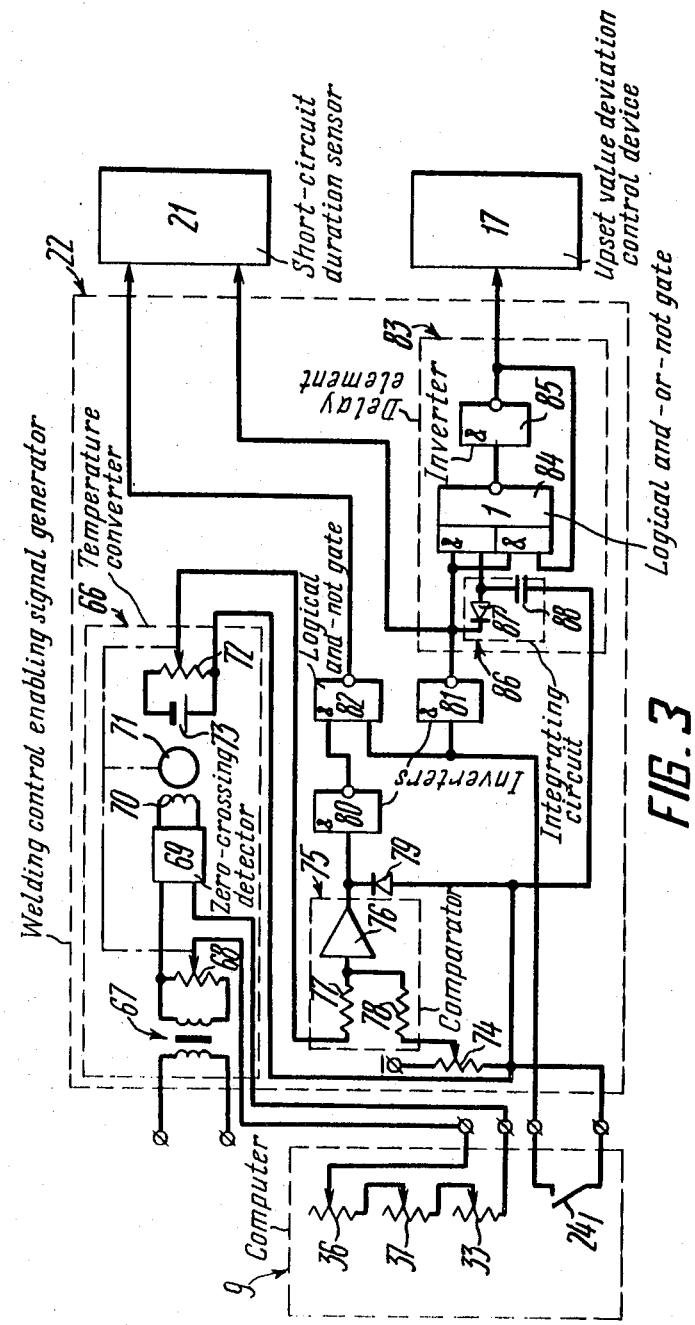
FIG. 3 is a circuit diagram of a welding control enabling signal generator.

The welding control enable signal generator 22 according to the invention comprises a temperature converter 66 (FIG. 3) incorporating a balance-type potentiometer 68 electrically connected to a power source 67 and having log resistance characteristic, the output terminals of said potentiometer being connected to one of the terminals of the circuit formed by the series-connected potentiometers 33,36,37 and to one of the input terminals of a zero-crossing detector 69 having its output electrically connected to a field winding 70 of a reversing electric motor whose shaft 71 is geared to the slide of the potentiometer 68 and to the slide of a linear potentiometer 72 electrically connected to a power source 73. The other input terminal of the zero-crossing detector 69 is connected to the other terminal of the circuit formed by the series-connected potentiometers 33,37 and 36.

The signal generator 22 also comprises a device for setting the temperature at the flashing-off butt ends, corresponding to the onset of control over the continuously run flashing process prior to upsetting. The temperature setting device in question is made in the form of a linear potentiometer 74, a comparator 75 based on an operational amplifier 76 with resistors 77 and 78 provided at the input. Connected to the operational amplifier 76 is a diode 79. In addition, the signal generator 22 comprises invertors 80, 81, a logical AND-NOT gate 82 and a delay element 83 built around a logical AND-OR-NOT gate 84 and an invertor 85 with an integrating circuit 86-diode 87 and a capacitor 88 provided at the input. The first input of the AND-NOT gate 82 is connected through the invertor 80 and comparator 75 to the slide of the linear potentiometer 74 and to the slide of the potentiometer 72 of the temperature converter 66. The second input of the AND-NOT gate 82 is connected to the make contacts $24_1$ of the relay 24 of the computer 9, and through the invertor 81 to the element 83 intended to delay a signal enabling linear upset allowance control and applied to the device 17. The outputs of the invertor 81 and of the AND-NOT gate 82 are connected to the input of the short-circuit duration sensing device 21, with a signal for enabling control over the continuously run flashing process prior to upsetting being generated at the output of the AND-NOT gate 82, and the upsetting current time enable control signal, at the output of the invertor 81.

Figure 4:
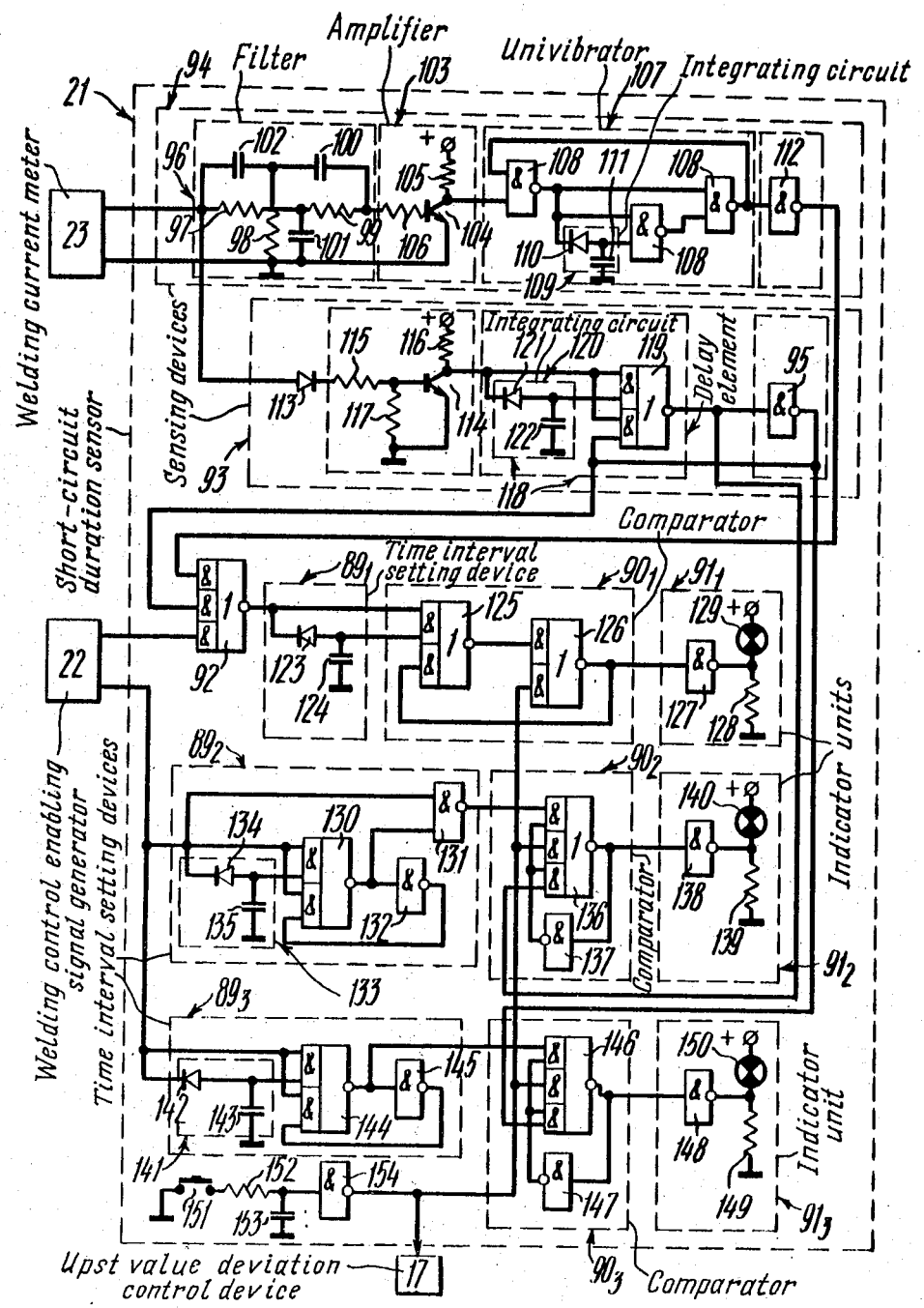
FIG. 4 is a circuit diagram of a sensing device intended to detect short-circuit duration in the welding circuit, according to the invention.

The sensing device 21 according to the invention for detecting short-circuit duration in the welding circuit comprises three measuring channels intended for controlling short-circuit duration prior to upsetting (first channel) and the upset current time according to its minimum (second channel) and maximum permissible value (third channel). Each of the channels comprises series-connected time interval setting device $89_1$, $89_2$, $89_3$ (FIG. 4), comparator $90_1$, $90_2$, $90_3$ and indicator unit $91_1$, $91_2$, $91_3$. The inputs of setting devices $89_2$, $89_3$ are electrically connected to the output of the invertor 81 (FIG. 3) of the signal generator 22. The comparator $90_1$ (FIG. 4) is connected through a logical unit 92 for detecting short circuit in the welding circuit to the output of the invertor 82 (FIG. 3) of the signal generator 22. The inputs of the logical unit 92 (FIG. 4) are also connected to the outputs of a welding current control sensing device 93 and a current ripple frequency sensing device 94. The inputs of the sensing devices 93 and 94 are connected to the welding current meter 23 which is basically a current transformer electrically connected to the primary circuit of the welding transformer 1 (FIG. 1). In addition, the output of the sensing device 93 (FIG. 4) is connected to the input of the comparator $90_2$ of the second channel and to the comparator $90_3$ of the third channel through the invertor 95.

The sensing device 94 according to the invention for registering the current ripple frequency comprises a band-rejection T-shaped filter 96 built around resistors 97, 98, 99 and capacitors 100, 101, 102 and set to the current supply frequency, an amplifier 103 comprising a transistor 104 with resistors 105 and 106, and a univibrator 107 built around a logical AND-NOT elements 108 with an integrating circuit 109 comprising a diode 110 and a capacitor 111 at its input, and an inverter 112 at its output.

The device 93 according to the invention for sensing the presence of welding current comprises a diode 113, an amplifier built around a transistor 114 with resistors 115, 116 and 117, an input signal delay element 118 comprising a logical AND-OR-NOT gate 119 and an integrating circuit 120 with a diode 121 and a capacitance 122 at its input, and the invertor 95.

The logical unit 92 for detecting short circuit in the welding circuit is built around a logical AND-OR-NOT gate. The device $89_1$ for setting permissible duration of short circuit in the flashing-off butt ends prior to upsetting is formed as an integrating circuit which comprises a diode 123 and a capacitance 124. The comparator $90_1$ is built around microcircuits 125, 126, and the indicator unit $91_1$ comprises an invertor 127, a resistor 128 and a signal lamp 129.

The device $89_2$ for setting a minimum permissible upset current time comprises a logical AND-OR-NOT element 130 and an AND-NOT element 131, an invertor 132 at its output and an integrating circuit 133 with a diode 134 and capacitance 135 at its input. The comparator $90_2$ with a memory element is built around microcircuits 136 and 137, and the indicator unit $91_2$ comprises an invertor $13^8$, a resistor 139 and a signal lamp 140.

The device $89_3$ for setting maximum permissible upset current time includes an integrating circuit 141 with a diode 142 and a capacitance 143 at its input, a logical AND-OR-NOT gate 144, and an invertor 145 at its output. The comparator $90_3$ with a memory element is built around microcircuits 146 and 147, and the indicator unit $91_3$ comprises an invertor 148, a resistor 149 and a signal lamp 150.

The sensing device 21 for detecting short-circuit duration in the welding circuit also comprises a reset circuit incorporating a button 151 and a $\Gamma$-shaped filter comprising a resistor 152, a capacitor 153 and an invertor 154. The output of the invertor 154 is connected to the upset value control deviation device 17 and to the comparators $90_1$, $90_2$, $90_3$.

Figure 5:
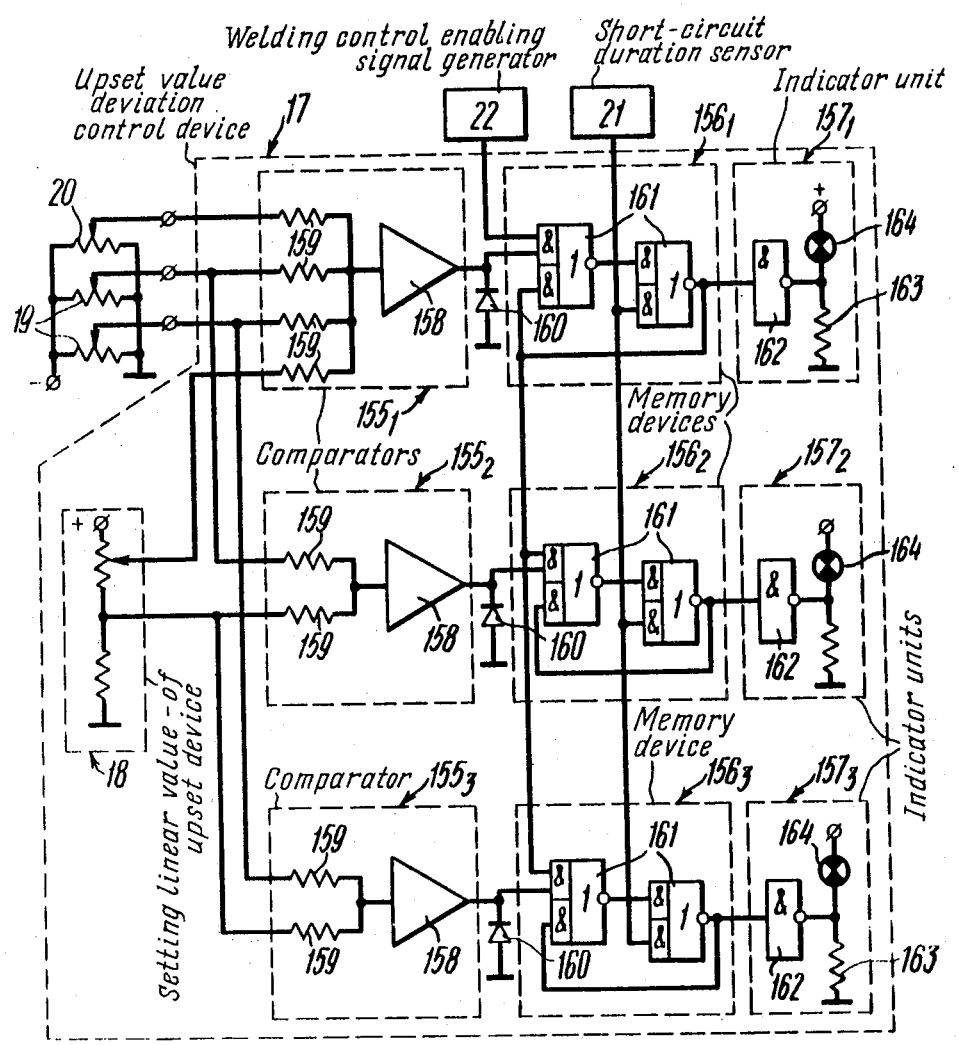
FIG. 5 is a circuit diagram of an ipset value deviation control device, according to the invention.

The upset value control deviation device 17 (FIG. 5) comprises three measuring channels: a first channel intended for detecting deviation in the upset value irrespective of the causes bringing about such deviation; a second and a third channel for detecting slippage of the workpieces 4 (FIG. 1) in the machine movable and stationary clamping jaws 2 and 3, respectively. Each of the channels respectively comprises series-connected comparators $155_1$ (FIG. 5), $155_2$, $153_3$, memory devices $156_1$, $156_2$, $156_3$ and indicator units $157_1$, $157_2$, $157_3$.

The input of the memory device $156_1$ is connected to the control enabling signal generator 22 and its output, to the inputs of the memory devices $156_2$, $156_3$, with the slippage signal circuits being actuated in the event of deviation of the upset allowance from a preset value.

The inputs of the comparator $155_1$ are connected to the slippage sensing devices 19, to the sensor device for detecting the misalignment of the rod of the follow-up slide valve 7 (FIG. 1) relative to its body and to the device 18 (FIG. 5) for setting a permissible upset value deviation. The inputs of the comparators $155_2$ and $155_3$ are connected to the setting device 18 and to the sensors 19 which are fixedly attached to the machine clamping jaws and have at the output thereof a liner potentiometer whose slide is kinematically linked to the articles 4 being welded FIG. 1. The misalignment sensing device 20 is rigidly secured to the body of the follow-up slide valve 7 whose rod is geared to the slide of the output linear potentiometer of the sensing device 20.

The comparators $155_1$, $155_2$, $155_3$ (FIG. 5) of each of the measuring channels are based on d-c operational amplifiers 158 comprising resistors 159. Connected to the output of each of the operational amplifiers is a diode 160 connected to a respective memory device $156_1$, $156_2$, $156_3$, which are built around logical AND-OR-NOT elements 161. An indicator unit $157_1$, $157_2$, $157_3$ of each measuring channel comprises an invertor 162, a current limiting resistor 163 and a signal lamp 164.

Prior to welding, the setting device 18 (FIG. 1) is operated to set a permissible upset value, and the setting devices $89_1$, $89_2$, (FIG. 4) to set values of controlled short-circuit duration in the welding circuit. In addition, the linear potentiometer 74 (FIG. 3) for setting the temperature at the flashing-off butt ends, corresponding to the onset of control over the continuously run flashing process prior to upsetting, is used to set a value of the flashing-off butt ends temperature, corresponding to the onset of control over the short-circuit duration in the welding circuit prior to upsetting. The temperature value set by the temperature setting device should be about 50° to 100° lower than the temperature $T_k$ of the flashing-off butt ends at the initial stage of upset action, set by the setting device 10 (FIG. 1) of the computer 9. In addition, respective temperature values are set by the setting device 11 and a relative power level, by the setting device 16. To perform the welding process on the machine according to the invention, a number of preliminary operations are carried out. These include: the setting of secondary voltage $U_{20}$ of the setting of the welding transformer 1; the temperature setting devices 10 and 11 by shifting the handles of the potentiometers 51 and 58 (FIG. 2); the rate of upsetting is varied with pressure in the hydraulic system of the actuator 6 (FIG. 1) for displacing the movable clamping jaw 3.

Upon completing of the preliminary operations, the articles 4 to be welded are gripped in the machine movable clamping jaw 3 and stationary clamping jaw 2. It is necessary to establish electric contact between the articles 4 being welded, with its line passing in the middle between the clamping jaws 2 and 3. Thereafter, the unit 8 is positioned on one of the articles 4 withing a given distance from the flashing-off butt end so as to measure temperatures $T_1$ and $T_2$ at two sections of the articles 4 with the aid of the thermocouples 29 and 30 (FIG. 2), said unit being movable along the surfaces of the articles 4 being welded (FIG. 1). Thence, the current leads 5 are connected to the articles 4 and the welding transformer 1 is energized.

The welding machine according to the invention is operated in the following manner.

In the course of flashing a desirable rate of travel of the movable clamping jaw 3, corresponding to the position of the device 16, is set by means of a power regulator of the device 15, acting upon the actuator 12. The articles 4 being welded are heated in the process of flashing. As this happens, signals proportional to temperatures $T_1$ and $T_2$ are applied to the output of the thermocouples 29 and 30 (FIG. 2), which are then transmitted to the inputs of the self-compensating converters 25, thereby shifting the slides of the potentiometers 33 to 37 with transformation characteristic.

This permits the computer 9 (FIG. 1) to solve the following systems of equations:

$$\begin{cases} T_1(X_1) = T_k \cdot e^{-kx_1} \\ T_2(X_2) = T_k \cdot e^{-kx_2} \\ T_b\left(\frac{l_{up}}{2}\right) = T_k \cdot e^{-k\frac{l_{up}}{2}} \end{cases} \quad (1)$$

where $l_{up}$ is the upset value

K is the decrement of exponent relative to $T_k$ and $l_{up}$ according to continuously measured values $T_1$, $T_2$, $X_1$ and $X_2$.

At the same time, initial distances $X_1$ and $X_2$ (FIG. 1) between the flashing-off but ends of the workpieces 4 and thermocouples 29 and 30 (FIG. 2) are changed as a result of flashing. Since the movable clamping jaw 3 is shifted during flashing together with the core of the differential transforming converter of the device 40 (FIG. 2), there appears on the signal windings 38 and 39 an unbalance signal intended to adjust the initial position of the thermocouples 29 and 30 relative to the flashing-off butt ends.

However, the distances $X_1$ and $X_2$ (FIG. 1) between the thermocouples 29 and 30 (FIG. 2) and the flashing-off butt ends of the articles 4 (FIG. 1) may remain unaltered in the process of welding. To this end the thermocouples 29 and 30 (FIG. 2) are shifted during welding away from the flashing-off butt ends at a speed equal half the speed of flashing off.

At the output of the potentiometers 33 to 37 with log transformation characteristic there appear signals whose values and voltages obey the following relationships:

$$U_1 = K_1 \cdot (X_2 - X_1) \cdot l_n T_1$$
$$U_2 = K_2 \cdot X_1 \cdot l_n T_1$$
$$U_3 = K_3 \cdot X_1 \cdot l_n T_2$$
$$U_4 = K_4 \cdot l_{up} \cdot l_n T_1$$
$$U_5 = K_5 \cdot l_{up} \cdot l_n T_2 \quad (2)$$

where $K_1$, $K_2$, $K_3$, $K_4$, $K_5$ are the proportionality factors.

The integrated voltage resulting from series connection of the outputs of the potentiometers 33 to 37 is expressed by the relationship $$U_{\Sigma 1} = K_1(X_2 - X_1)l_n T_1 +$$
$$K_2 X_1 l_n T_1 - K_3 X_1 l_n T_2 -$$
$$K_4 \cdot l_{up} \cdot l_n T_1 + +$$
$$K_5 \cdot l_{up} \cdot l_n T_2 \quad (3)$$

If $K_1 = K_2 = K_3 = 2K_4 = 2K_5 = m$ the relationship (3) is reduced to $$U_3 = m \cdot \left[ (X_2 = X_1) \cdot l_n T_1 + X_1 \cdot l_n T_1 - X_1 \cdot l_n T_2 - \frac{l_{up}}{2} \cdot l_n T_1 + \frac{l_{up}}{2} \cdot l_n T_2 \right] \quad (4)$$

Voltage $U_{\Sigma 1}$ is electrical analogy of the left-hand member of the relationship between parameters $T_1, T_2, X_1, X_2$, obtained from the solution of the set of equations (1):

$$(X_2 - X_1) \cdot l_n T_1 + X_1 \cdot l_n T_1 - X_1 \cdot l_n T_2 - \frac{l_{up}}{2} \cdot l_n T_1 + \frac{l_{up}}{2} \cdot l_n T_2 = (X_2 - X_1) \cdot T_b \quad (5)$$

Thus, by virtue of feeding voltage $U_{\Sigma 1}$ in series opposition with the voltage of the device 11 (FIG. 1) for setting temperature $T_b$ at the weld joint boundary, equal to $$U_{11} = m(X_2 - X_1) \cdot l_n T_b \quad (6)$$

at the input of the amplifier 49 (FIG. 2) whose output is connected to the reversing electric motor 64 kinematically linked to the converter of the sensing device 43, automatic balancing of voltage $U_{\Sigma 1}$ and $U_{11}$ is ensured. At the same time, a stop member (not shown), coupled to the electric motor and intended to regulate the calculated upset value, is shifted for linear value $l_{up}$ with the resulting equality of $U_{\Sigma 1}$ and $U_{11}$, this being the solution to the set (1) of equations as regards $l_{up}$.

In similar manner it is possible to express an integrated voltage of the potentiometers 33, 36 and 37, connected in series with the temperature setting device 10 (FIG. 1) to the input of the amplifier 50, by the following relationship:

$$U_{\Sigma 2} = K_1 \cdot (X_2 - X_1) \cdot l_n T_1 + K_2 \cdot X_1 \cdot l_n T_1 - K_3 \cdot X_1 \cdot l_n T_2 = m[(X_2 - X_1) \cdot l_n T_1 + X_1 \cdot l_n T_1 - X_1 \cdot l_n T_2] \quad (7)$$

Voltage $U_{\Sigma 2}$ is electrical analogy of the left-hand member of the relationship between parameters $T_1, T_2, X_1, X_2$ and $T_k$ in solving the set of equations (1) as regards $T_k$ $$(X_2 - X_1) \cdot l_n T_1 + X_1 \cdot l_n T_1 - X_1 \cdot l_n T_2 = (X_2 - X_1) \cdot l_n T_k \quad (8)$$

By feeding voltage $U_{\Sigma 2}$ in series opposition with the voltage of the setting device 10, equal to $$U_{10} = m(X_2 - X_1) \cdot l_n T_k \quad (9)$$

at the input of the phase-sensitive amplifier 50 (FIG. 2), the two-position valve 65, connected to the output of the amplifier 50, is actuated to initiate the upset operation at the moment when equations (8 and 9) are being fulfilled, i.e. at the moment of achieving a preset temperature $T_k$ at the flashing-off butt ends.

The voltage at the output of the potentiometers 68 (FIG. 3) and 72 of the temperature converter 66 is determined from the following relationships:

$$U_{\Theta 1} = K_2 \cdot l_n\left(1 + \frac{\alpha}{\alpha_o}\right) \quad (10)$$

$$U_b = K_3 \cdot l_n\left(1 + \frac{\alpha}{\alpha_o}\right) \quad (11)$$

where
$K_2$ and $K_3$ are the proportionality factors;
$\alpha/\alpha$ is the relative displacement of the potentiometer slide.
Taking into account that $$K_2 \cdot l_n\left(1 + \frac{\alpha}{\alpha_o}\right) = K_1 \cdot l_n T_k \quad (12)$$

than with $K_1 = K_2$ $$1 + \frac{\alpha}{\alpha_o} = T_k \quad (13)$$

$$U_b = K_3 \cdot T_k \quad (14)$$

i.e. the output voltage $U_b$ of the converter 66 is proportional to temperature $T_k$.

A current value of temperature Tk is compared in the comparator 75 of the signal generator 22 against the value preset by the linear potentiometer 74 of the device for setting a temperature at the flashing-off butt ends, corresponding to the onset of control over the continuously run flashing process prior to upset operation. With the temperature values being equal, will be zero potential (logical zero state) at the output of the comparator 75 and, consequently, at the output of the AND-NOT gate, which is a signal enabling control over the continuously run flashing operation.

Short circuits in the welding circuit are detected by means of the logical unit 92 (FIG. 4) of the sensing device 21 for detecting the presence of welding current and absence of high-frequency ripples thereof. Here, the signals of logical zero state are applied to the input of the logical unit 92 from the output of the invertor 112 of the sensing device 94 and from the output of the invertor 95 of the sensing device 93. If the short-circuit duration in the flashing-off butt ends exceeds the value preset by the setting device 89₁, the signal lamp 129 of the indicator unit 91₁ will be switched on.

Upon achieving temperature Tk corresponding to the value preset by the setting device 10 (FIG. 1), the two-position valve 65 (FIG. 2) is operated to initiate the beginning of the upset operation and the relay 24 picks up to close a circuit by means of the make contact 24₁. As this happens, there is generated at the output of the AND-NOT gate 82 (FIG. 3) a logical one state signal forbidding the continuity control at the final stage of upsetting. At the same time a logical state signal arises at the output of the inverter 81, which signal enabling control over the upsetting current time. This signal functions to switch over the logical AND-NOT gate 131 (FIG. 4) of the device 89₂ for setting a minimum permissible upset current time into logical zero state which is maintained for a predetermined time interval.

If the welding transformer 1 (FIG. 1) is cut out, a logical zero state signal will appear at the output of the AND-OR-NOT gate 119 (FIG. 4) of the delay element 118 of the sensing device 77. Also, a one state signal will appear at the output of the comparator 90₂ and the signal lamp 140 will be switched on in the indicator unit 91₂.

In the event the current upset time exceeds a maximum permissible value, a zero state signal will appear at the outputs of the invertors 95 of the sensor 93 and at the output of the AND-OR-NOT gate 144 of the setting device 89₃. Therewith, a one state signal will appear at the output of the memory element, i.e. of the logical AND-OR-NOT gate 146 of the comparator 90₃, and the signal lamp 144 will be switched on in the indicator unit 91₃ through the invertor 148.

After the movement of the clamping jaw 3 (FIG. 1) is discontinued in the course of upsetting, there is applied a one state signal from the delay element 83 (FIG. 3) of the signal generator 22 to the input of the memory element 156 (FIG. 5), enabling the onset of control over the deviation of upset value. If, however, the integrated voltage, applied from the sensing devices 19 and 20 (FIG. 1) to the input of the comparator 155 (FIG. 5), or one of the summands exceed the permissible deviation in the upset value, determined by the position of the setting device 18 (FIG. 1), there will appear at the output of the comparator 155₁ (FIG. 5) a one state signal to be memorized by the device 156₁ which will switch on the signal lamp 164 of the indicator unit 157₁. The signal lamps 164 of the indicator units 157₂ and 157₃ are operated in similar manner to indicate the slippage of workpieces in any of the machine clamping jaws 3,2 (FIG. 1).

Upon completion of the welding cycle, all the signal lamps 129,140,150 (FIG. 4) are switched off by pushing the button 151.

The flash butt-welding machine according to the invention makes it possible to prevent weld joints of poor quality during welding of a pipeline and to thereby improve its operating reliability.

What is claimed is:

1. A machine for continuous flash butt welding of parts, comprising:
    a welding transformer with a primary winding and a secondary winding;
    a frame;
    a movable clamping jaw and a stationary clamping jaw mounted on said frame for clamping workpieces mounted thereon;
    a follow-up slide valve including a valve body and a rod;
    hydraulic actuator means for displacing said movable clamping jaw and governed by said follow-up slide valve;
    an automatic flashing-off speed control device;
    a computer having an output, and including an automatic beginning-of-upset control device and an automatic upset value control device having an input, said computer, said automatic beginning-of-upset control device and said automatic upset value control device being incorporated in one unit;
    a welding current meter forming one element of a welding circuit, and having an input connected to said primary winding of the welding transformer, and having an output;
    first sensor means connected to the output of said welding current meter for detecting a short-circuit duration in the welding circuit;

control means having an output for controlling an upset value deviation, and provided with second sensor means for detecting slippage of said workpieces mounted on and welded in said clamping jaws;

third sensor means mounted on said follow-up slide valve for indicating misalignment of said rod of said follow-up slide valve relative to said valve body, and having an input and an output, said output of the third sensor means being connected to the input of said control means;

a welding control enabling signal generator having an input and outputs, said input of the welding control enabling signal generator being connected to the output of said computer, said outputs of the welding control enabling signal generator being connected to said first sensor means for detecting short-circuit duration in the welding circuit and to said control means; and actuators of said automatic flashing-off speed, beginning-of-upset and upset value control devices for controlling the flashing-off speed, beginning of upset operation, and upset value, respectively, being combined in a further single unit.

2. A machine as claimed in claim 1, comprising:

fourth sensor means for detecting the presence of welding current;

a welding current ripple frequency sensor; and a logical unit for detecting short circuits;

said first sensor means for detecting short-circuit duration in the welding circuit comprising:

a first measuring channel for controlling the short-circuit duration at the final stage of flashing operation prior to upsetting, and having an input;

a second measuring channel having an output for controlling a minimum permissible value of short-circuit duration, and having an input; and a third measuring channel for controlling a maximum permissible value of short-circuit duration, and having an input;

said measuring channels each having an input and an output, and comprising a series-connected time interval setting circuit, a comparator with a memory element, and an indicator unit;

said input of the first measuring channel being connected to said welding control enabling signal generator, to a welding current control sensor, and to said welding current ripple frequency sensor through said logical unit for detecting short circuits;

said inputs of the second and third measuring channels being connected to said welding control enabling signal generator;

said welding current control sensor having an output connected to said comparators of the second and third measuring channels, respectively.

3. A machine as claimed in claim 2, said computer comprising a phase-sensitive amplifier with an input, an fifth sensor means for indicating the distance between thermocouples and flashing-off butt ends of the workpieces, and having a common point with the input of said phase-sensitive amplifier, and a differential-transforming converter of said fifth sensor means;

said welding control enabling signal generator comprising:

termperature converting means for converting the temperature of the workpiece flashing-off butt ends into voltage, and including first and second input terminals and output terminals;

an AND-NOT gate with two inputs and an output;

setting means for setting a temperature at the butt ends of the workpieces being welded, corresponding to the onset of control over a continuously run flashing process, and comprising a potentiometer with a slide;

a comparator having two inputs and an output;

the first input of said comparator being connected to said temperature converting means;

the second input of said comparator being connected to said setting means;

a first inverter having an input connected to the output of said comparator and an output connected to the first input of said AND-NOT gate;

a delay element being connected to said upset value deviation control device;

a relay having make contacts connected to the second input of said AND-NOT gate;

a second inverter having an input connected to said delay element and an output connected to said inputs of the second and third measuring channels, respectively, of said first sensor means;

said second input of said AND-NOT gate being connected to said output of said second inverter;

said output of said AND-NOT gate being connected to said first measuring channel of said first sensor means;

said first input terminal of said temperature converting means being connected to said slide of the potentiometer;

said second input terminal of said temperature converting means being connected to said differential-transforming converter of said fifth sensor means.

4. A machine as claimed in claim 3, said temperature converting means comprising:

a voltage source;

a d-c voltage source;

a balance-type potentiometer with a log transformation characteristic, and having first and second output terminals, said first output terminal being connected to said first input terminal of said temperature converting means;

said balance-type potentiometer being connected to said voltage source;

a zero-crossing detector having first and second input terminals, said first input terminal being connected to said second output terminal of the balance-type potentiometer and said second input terminal being connected to said second input terminal of the temperature converting means, and having an output;

a reversing electric motor electrically connected to the output of said zero-crossing detector;

a linear potentiometer in the form of a rheochord with a slide, said reochord having an extreme point, and gear-connected to said reversing electric motor, said linear potentiometer being connected to said d-c voltage source; and said output terminals of the temperature converting means being connected to said slide and said extreme point of said rheochord of the linear potentiometer.

5. A machine as claimed in claim 3, wherein said computer comprises:

two self-compensating converters provided with reversing electric motors for converting measured temperature into rotation angles of shafts of said reversing electric motors;

an operational logarithmic element having an output circuit;

an operational multiplication element made integral with said operational logarithmic element in the form of slide-wire potentiometers with a logarithmic characteristic having extreme points thereof, and connected to the outputs of said fifth sensor means, for setting the temperature at the butt ends of the workpieces being welded, and having an output circuit;

sixth sensor means for registering a current upset value, and comprising a differential-transforming converter including a core mounted on said frame, two signal windings, and a field winding mounted as one coil on said movable clamping jaw, said core being movable relative to said coil; and an operational element of algebraic addition provided by electrical series connection of the respective output circuits of said operational logarithmic element and said operational multiplication element with said setting means.

* * * * *